US011868199B2

(12) United States Patent
Kim et al.

(10) Patent No.: US 11,868,199 B2
(45) Date of Patent: Jan. 9, 2024

(54) SYSTEM FOR DETECTING ANOMALY AND METHOD FOR SETTING THRESHOLD THEREOF

(71) Applicants: HYUNDAI MOTOR COMPANY, Seoul (KR); Kia Corporation, Seoul (KR); Seoul National University R&DB Foundation, Seoul (KR)

(72) Inventors: Ji Hoon Kim, Seoul (KR); Sung Soo Park, Incheon (KR); Chang Woo Chun, Suwon-si (KR); Song Eun Lee, Seongnam-si (KR); Hyun Soo Cho, Seoul (KR); Jun Yeob Kim, Seoul (KR); Sang Goo Lee, Seoul (KR)

(73) Assignees: HYUNDAI MOTOR COMPANY, Seoul (KR); KIA CORPORATION, Seoul (KR); SEOUL NATIONAL UNIVERSITY R&DS FOUNDATION, Seoul (KR)

( * ) Notice: Subject to any disclaimer, the term of this patent is extended or adjusted under 35 U.S.C. 154(b) by 31 days.

(21) Appl. No.: 17/702,234

(22) Filed: Mar. 23, 2022

(65) Prior Publication Data
US 2023/0076888 A1    Mar. 9, 2023

(30) Foreign Application Priority Data
Sep. 7, 2021  (KR) .......................... 10-2021-0119157

(51) Int. Cl.
*G06F 11/07*   (2006.01)
*G06F 17/18*   (2006.01)

(52) U.S. Cl.
CPC ............ *G06F 11/076* (2013.01); *G06F 17/18* (2013.01)

(58) Field of Classification Search
CPC .............................. G01F 11/076; G06F 17/18
See application file for complete search history.

(56) References Cited

U.S. PATENT DOCUMENTS

| 8,239,203 | B2 | 8/2012 | Stubley et al. |
| 9,582,828 | B2 | 2/2017 | Moyne |
| 2004/0059697 | A1* | 3/2004 | Forman ................. G06F 18/211 706/46 |
| 2020/0209842 | A1* | 7/2020 | Koizumi ................. G06N 7/01 |
| 2020/0357506 | A1 | 11/2020 | Liao et al. |
| 2020/0387797 | A1* | 12/2020 | Ryan ...................... G06N 3/084 |

(Continued)

OTHER PUBLICATIONS

Brodersen et al., The Binormal Assumption on Precision-Recall Curves, 2010 Inertnational Conference on Pattern Recognition, 2010, pp. 4263-4266 (Year: 2010).*

(Continued)

*Primary Examiner* — Raymond L Nimox
(74) *Attorney, Agent, or Firm* — MORGAN, LEWIS & BOCKIUS LLP

(57) ABSTRACT

The present disclosure relates to a system for detecting an anomaly and a method for setting a threshold thereof. The method includes setting a minimum true positive rate (TPR) and a differentiation slope based on a user input, creating a receiver operating characteristic (ROC) curve using anomaly data and normal data, estimating a true negative rate (TNR) from the ROC curve based on the minimum TPR and the differentiation slope, and estimating and setting the threshold based on the estimated TNR.

14 Claims, 11 Drawing Sheets

(56) References Cited

U.S. PATENT DOCUMENTS

| | | | | |
|---|---|---|---|---|
| 2021/0034819 | A1* | 2/2021 | Wang | G06F 16/355 |
| 2022/0004920 | A1* | 1/2022 | Nishiyama | G06N 20/00 |
| 2022/0122629 | A1* | 4/2022 | Koizumi | G05B 23/02 |
| 2023/0119103 | A1* | 4/2023 | Nishiyama | G06N 20/10 |
| | | | | 706/12 |

OTHER PUBLICATIONS

Munir et al., Pattern-Based Contextual Anomaly Detection in HVAC Systems, 2017 IEEE International Conference on Data Mining Workshops, 2017, pp. 1066-1073 (Year: 2017).*

Mathur et al., Anode: Empirical Detection of Performance Problems in Storage Systems Using Time-Series Analysis of Periodic Measurements, 2014 IEEE, 12 Pgs (Year: 2014).*

Bewick, Viv, Liz Cheek, and Jonathan Ball. "Statistics review 13: receiver operating characteristic curves." Critical care 8.6 (2004): 1-5. (Year: 2004).*

Choi, Bernard CK. "Slopes of a receiver operating characteristic curve and likelihood ratios for a diagnostic test." American journal of epidemiology 148.11 (1998): 1127-1132. (Year: 1998).*

Fan, Jerome, Suneel Upadhye, and Andrew Worster. "Understanding receiver operating characteristic (ROC) curves." Canadian Journal of Emergency Medicine 8.1 (2006): 19-20. (Year: 2006).*

Florkowski, Christopher M. "Sensitivity, specificity, receiver-operating characteristic (ROC) curves and likelihood ratios: communicating the performance of diagnostic tests." The Clinical Biochemist Reviews 29.Suppl 1 (2008): S83. (Year: 2008).*

Zweig, Mark H., and Gregory Campbell. "Receiver-operating characteristic (ROC) plots: a fundamental evaluation tool in clinical medicine." Clinical chemistry 39.4 (1993): 561-577. (Year: 1993).*

Hajian-Tilaki, Karimollah. "Receiver operating characteristic (ROC) curve analysis for medical diagnostic test evaluation." Caspian journal of internal medicine 4.2 (2013): 627. (Year: 2013).*

Park, Seong Ho, Jin Mo Goo, and Chan-Hee Jo. "Receiver operating characteristic (ROC) curve: practical review for radiologists." Korean journal of radiology 5.1 (2004): 11-18. (Year: 2004).*

* cited by examiner

SYSTEM FOR DETECTING ANOMALY AND METHOD FOR SETTING THRESHOLD THEREOF

CROSS-REFERENCE TO RELATED APPLICATION

This application is based on and claims the benefit of priority to Korean Patent Application No. 10-2021-0119157 filed on Sep. 7, 2021 with the Korean Intellectual Property Office, the entire contents of which are incorporated herein by reference.

TECHNICAL FIELD

The present disclosure relates to a system for detecting an anomaly and a method for setting a threshold thereof.

BACKGROUND

In general, anomaly detection performance measurement uses a receiver operating characteristic (ROC) curve-based anomaly detection performance measurement scheme. The ROC curve-based anomaly detection performance measurement scheme measures a false positive rate (FPR) when a true positive rate (TPR) is N %. In this connection, the FPR, which is a numeric value indicating an anomaly detection performance, may be referred to as FPR @ TPR N % (False Positive Rate at True Positive Rate N %) or FPR @ N %. The lower the FPR, the fewer false positives, and the better the performance. In addition, a specific threshold that meets TPR N % is set as a threshold for anomaly detection. As such, conventionally, a scheme for measuring the anomaly detection performance when a normal detection performance numeric value is fixed is used to measure the anomaly detection performance. Therefore, as the TPR is fixed to N %, a TPR (recall) loss of (100-N) % occurs unconditionally, and laborious work to set an appropriate N based on an anomaly detection model is inevitable.

SUMMARY

The present disclosure has been made to solve the above-mentioned problems occurring in the prior art while maintaining the advantages achieved by the prior art.

An aspect of the present disclosure provides a system for detecting an anomaly and a method for setting a threshold thereof that adaptively estimate and set an anomaly detection threshold that simultaneously minimizes a loss of a precision and false positives of a receiver operating characteristic curve-based anomaly detection.

The technical problems to be solved by the present disclosure are not limited to the aforementioned problems, and any other technical problems not mentioned herein will be clearly understood from the following description by those skilled in the art to which the present disclosure pertains.

According to an aspect of the present disclosure, a method for setting a threshold of a system for detecting an anomaly includes setting, by a processor, a minimum true positive rate (TPR) and a differentiation slope based on a user input, creating, by the processor, a receiver operating characteristic (ROC) curve using anomaly data and normal data, estimating, by the processor, a true negative rate (TNR) from the ROC curve based on the minimum TPR and the differentiation slope, and estimating and setting, by the processor, the threshold based on the estimated TNR.

In one implementation, the estimating of the TNR may include estimating, by the processor, a TNR point where a first-order differentiation value of the ROC curve becomes the differentiation slope.

In one implementation, the estimating of the TNR may include estimating, by the processor, a differentiable functional formula using distribution information of the anomaly data and the normal data, and estimating, by the processor, a TNR point where a first-order differentiation value of the estimated functional formula becomes the differentiation slope.

In one implementation, the estimating of the TNR may include estimating, by the processor, a TNR point where a second-order differentiation value of the ROC curve becomes the differentiation slope.

In one implementation, the estimating of the TNR may include returning, by the processor, the estimated TNR when the estimated TNR is equal to or greater than the minimum TPR.

In one implementation, the estimating of the TNR may further include stopping, by the processor, the TNR estimation and returning the minimum TPR as the estimated TNR when the estimated TNR is smaller than the minimum TPR.

In one implementation, the estimating and the setting of the threshold may include setting, by the processor, a predicted probability obtained when a recall is the estimated TNR as the threshold.

According to another aspect of the present disclosure, a system for detecting an anomaly includes a memory for storing anomaly data and normal data, and a processor connected to the memory, and the processor sets a minimum true positive rate (TPR) and a differentiation slope based on a user input, creates a receiver operating characteristic (ROC) curve using the anomaly data and the normal data, estimates a true negative rate (TNR) from the ROC curve based on the minimum TPR and the differentiation slope, and estimates and sets a threshold based on the estimated TNR.

In one implementation, the processor may further estimate a TNR point where a first-order differentiation value of the ROC curve becomes the differentiation slope.

In one implementation, the processor may further estimate a differentiable functional formula using distribution information of the anomaly data and the normal data, and estimate a TNR point where a first-order differentiation value of the estimated functional formula becomes the differentiation slope.

In one implementation, the processor may further estimate a TNR point where a second-order differentiation value of the ROC curve becomes the differentiation slope.

In one implementation, the processor may further return the estimated TNR when the estimated TNR is equal to or greater than the minimum TPR.

In one implementation, the processor may further stop the TNR estimation and return the minimum TPR as the estimated TNR when the estimated TNR is smaller than the minimum TPR.

In one implementation, the processor may further set a predicted probability obtained when a recall is the estimated TNR as the threshold.

BRIEF DESCRIPTION OF THE DRAWINGS

The above and other objects, features and advantages of the present disclosure will be more apparent from the following detailed description taken in conjunction with the accompanying drawings.

DETAILED DESCRIPTION

Figure 1:
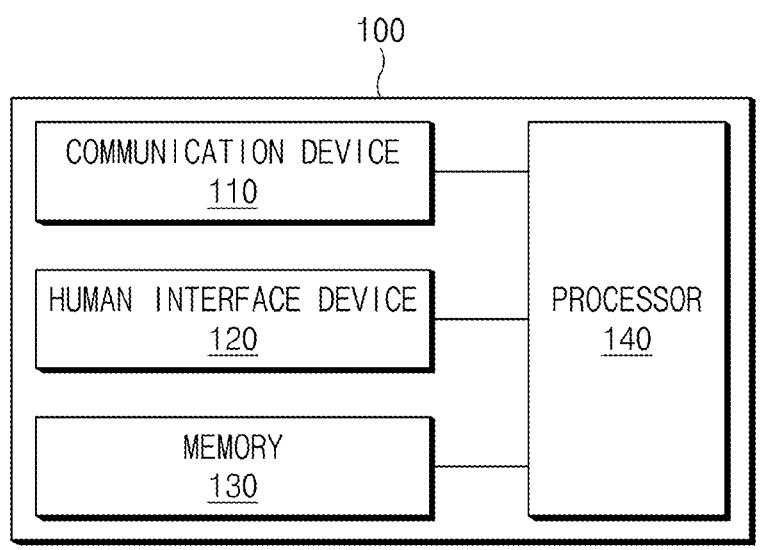
FIG. 1 is a block diagram illustrating an anomaly detection system according to embodiments of the present disclosure.

Hereinafter, some embodiments of the present disclosure will be described in detail with reference to the exemplary drawings. In adding the reference numerals to the components of each drawing, it should be noted that the identical or equivalent component is designated by the identical numeral even when they are displayed on other drawings. Further, in describing the embodiment of the present disclosure, a detailed description of the related known configuration or function may not be provided to not to unnecessarily interfere with the understanding of the embodiments of the present disclosure.

In describing the components of the embodiment according to the present disclosure, terms such as "first," "second," "A," "B," "(a)," "(b)," and the like may be used. These terms are merely intended to distinguish the components from other components, and the terms do not limit the nature, order or sequence of the components. Unless otherwise defined, all terms including technical and scientific terms used herein have the same meaning as commonly understood by one of ordinary skill in the art to which this disclosure belongs. It will be further understood that terms, such as those defined in commonly used dictionaries, should be interpreted as having a meaning that is consistent with their meaning in the context of the relevant art and will not be interpreted in an idealized or overly formal sense unless expressly so defined herein.

FIG. 1 is a block diagram illustrating an anomaly detection system according to embodiments of the present disclosure.

An anomaly detection system 100, which is a computing system for processing data, may include a communication device 110, a human interface device (HID) 120, a memory 130, and a processor 140.

The communication device 110 may use a wired network and/or a wireless network. The wired network may be implemented as a local area network (LAN), a wide area network (WAN), and/or an Ethernet. The wireless network may be implemented as at least one of communication technologies such as a wireless Internet (e.g., a wi-fi), a short-range communication (e.g., a Bluetooth, a Zigbee, and an infrared communication), and a mobile communication. The communication device 110 may include a communication processor, a communication circuit, an antenna, and/or a transceiver.

The human interface device 120 may be an input/output device for interaction with a user. The human interface device 120 may include a microphone, a keyboard, a keypad, a button, a switch, a touch pad, a touch screen, a display, a speaker, and/or a vibrator.

The memory 130 may store an anomaly detection threshold setting model and/or an anomaly detection model. In addition, the memory 130 may store setting information or the like that is determined by the user and/or a system developer in advance. The memory 130 may store test data received from the communication device 110 and/or the human interface device 120, that is, normal data and anomaly data.

The memory 130 may be a storage medium (a non-transitory storage medium) that stores instructions executed by the processor 140. The memory 130 may include at least one of storage media (recording media) such as a flash memory, a hard disk, a solid state disk (SSD), a secure digital card (SD card), a random access memory (RAM), a static random access memory (SRAM), a read only memory (ROM), a programmable read only memory (PROM), an electrically erasable and programmable ROM (EEPROM), an erasable and programmable ROM (EPROM), an embedded multimedia card (eMMC), and/or an universal flash storage (UFS).

The processor 140 may control overall operations of the anomaly detection system 100. The processor 140 may include at least one of processing devices such as an application specific integrated circuit (ASIC), a digital signal processor (DSP), a programmable logic device (PLD), a field programmable gate array (FPGA), a central processing unit (CPU), a microcontroller, and/or a microprocessor.

The processor 140 may generate a receiver operating characteristic (ROC) curve composed of a true positive rate (TPR) and a false positive rate (FPR) using the normal data and the anomaly data. The processor 140 may perform first-order differentiation on the generated ROC curve. The processor 140 may estimate a true negative rate (TNR) point at which a first-order differentiation value of the ROC curve becomes a preset differentiation slope a. In this connection, the TNR is a probability of an actual false among false predictions. The processor 140 may estimate a threshold ($\delta$) having an estimated TNR point ($\theta$) as a recall.

First, to obtain the ROC curve, the processor 140 may define a scoring function or a probability value indicating that data having a higher value is data having a higher probability of being the normal data. The processor 140 may measure scores for all data to be tested, that is, the normal data and the anomaly data, using the defined scoring function, and may sort the data in an ascending order based on the measured scores. The processor 140 may obtain coordinates of a graph after measuring (calculating) the FPR and the TPR sequentially using values (predicted probabilities) of the sorted list as a classification criterion (the threshold) of the normal data and the anomaly data. The processor 140 may repeat the operation until obtaining coordinates respectively corresponding to all of the data values of the sorted list.

Next, the processor 140 may receive a minimum TPR (N) and the first-order differentiation slope (α) from the human interface device 120 to estimate the TNR (recall) point. In this connection, the minimum TPR (N) and the first-order differentiation slope (α) may be manually set by the user. The minimum TPR, which is a numeric value indicating a maximum normal data classification performance that the user may tolerate (allow), may be referred to as the recall. The first-order differentiation slope is a numeric value indicating importance of a normal data classification performance and an anomaly data classification performance as a ratio. The higher the first-order differentiation slope, the higher the importance of the normal data classification performance. In addition, the lower the first-order differentiation slope, the higher the importance of the anomaly data classification performance. Basically, when a point at which the first-order differentiation slope (α) is '1' is found, a point at which a sum of the FPR and the recall is the maximum may be found. The first-order differentiation slope (α) may be arbitrarily specified (set) by the user based on a goal of the anomaly detection model. in addition, the processor 140 may receive a window size from the human interface device 120. The window size may be defined as a data processing unit (a processing capacity) for sensing change amounts of the FPR and the TPR.

The processor 140 may search for and return the TNR (θ) that matches the first-order differentiation slope (α) set by the user. In this connection, the processor 140 may stop the search and return 'θ=N' when the searched TNR (θ) becomes smaller than the minimum TPR (N).

Although the ROC curve has a cusp and is a continuous function, the differentiation may not be possible in entire sections of the ROC curve. Accordingly, when the ROC curve is non-differentiable, the processor 140 may perform simulation using following two methods to estimate the differentiation value from the ROC curve. The first is a method of simulating the first-order differentiation value by sensing the change amounts of the FPR and the TPR among data as much as the window size set by the user in the sorted list. In this connection, the smaller the window size, the closer to the differentiation value. However, when the window size is too small, the change amounts may not be sensed. The second is a method of approximating a graph made by successively connecting coordinate points with each other as a differentiable function. Methods such as bivariate normal distribution estimation and/or kernel density estimation may be used as the second method.

The processor 140 may estimate the threshold (δ) having the estimated TNR (θ) as the recall. In other words, when the recall is θ, the processor 140 may set the score or the predicted probability (δ) as the threshold (a reference value).

Figure 2:
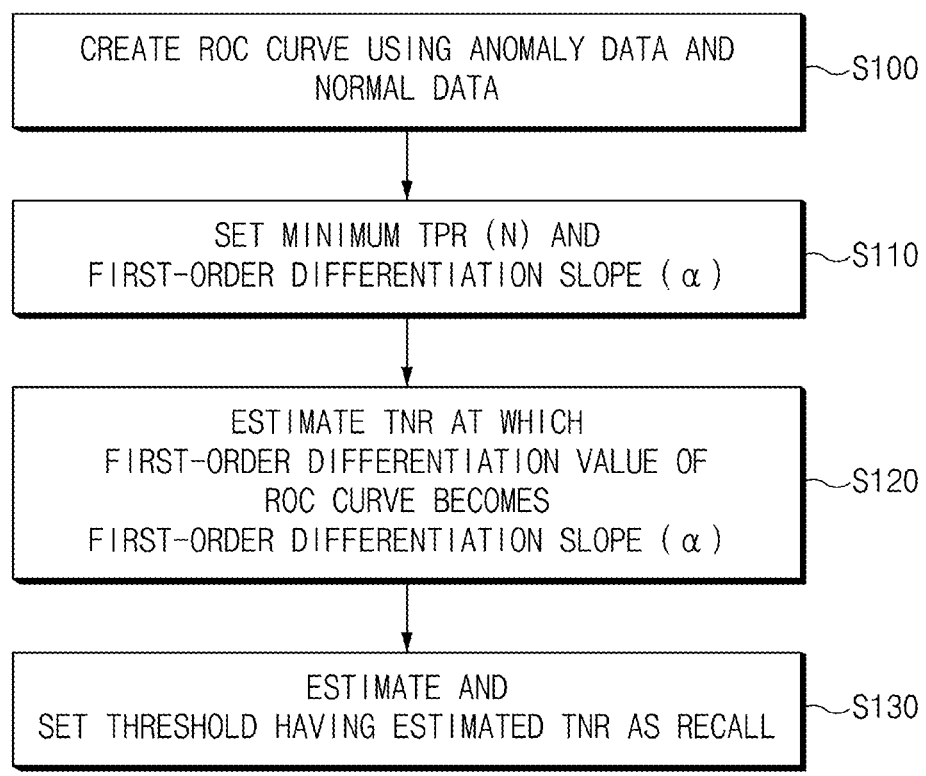
FIG. 2 is a flowchart illustrating a threshold setting method of an anomaly detection system according to an embodiment of the present disclosure.
Figure 3A:
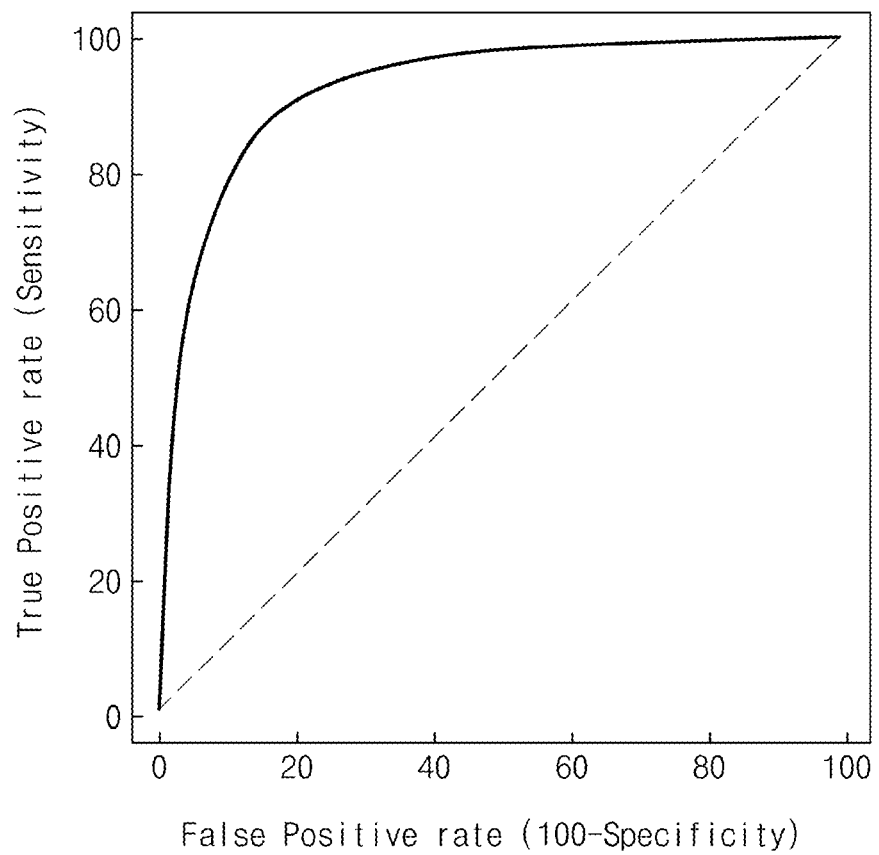
FIG. 3A is an exemplary diagram illustrating an ROC curve according to an embodiment of the present disclosure.
Figure 3B:
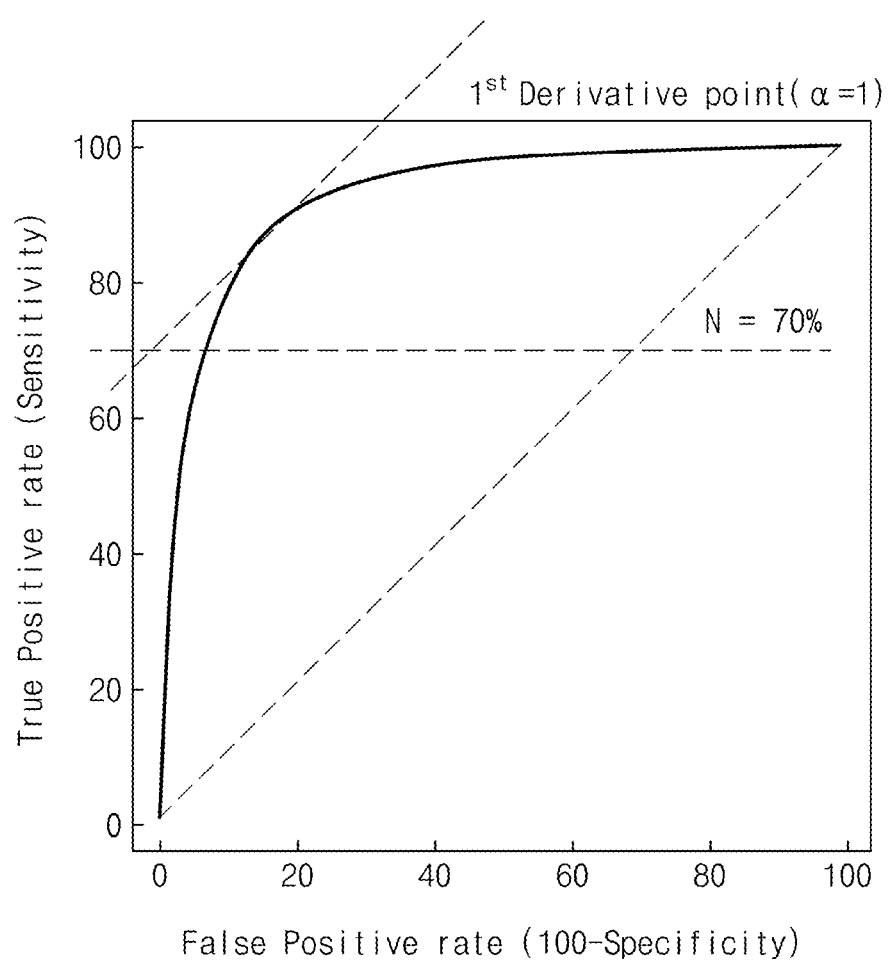
FIG. 3B is an exemplary diagram for illustrating TNR estimation according to an embodiment of the present disclosure.
Figure 3C:
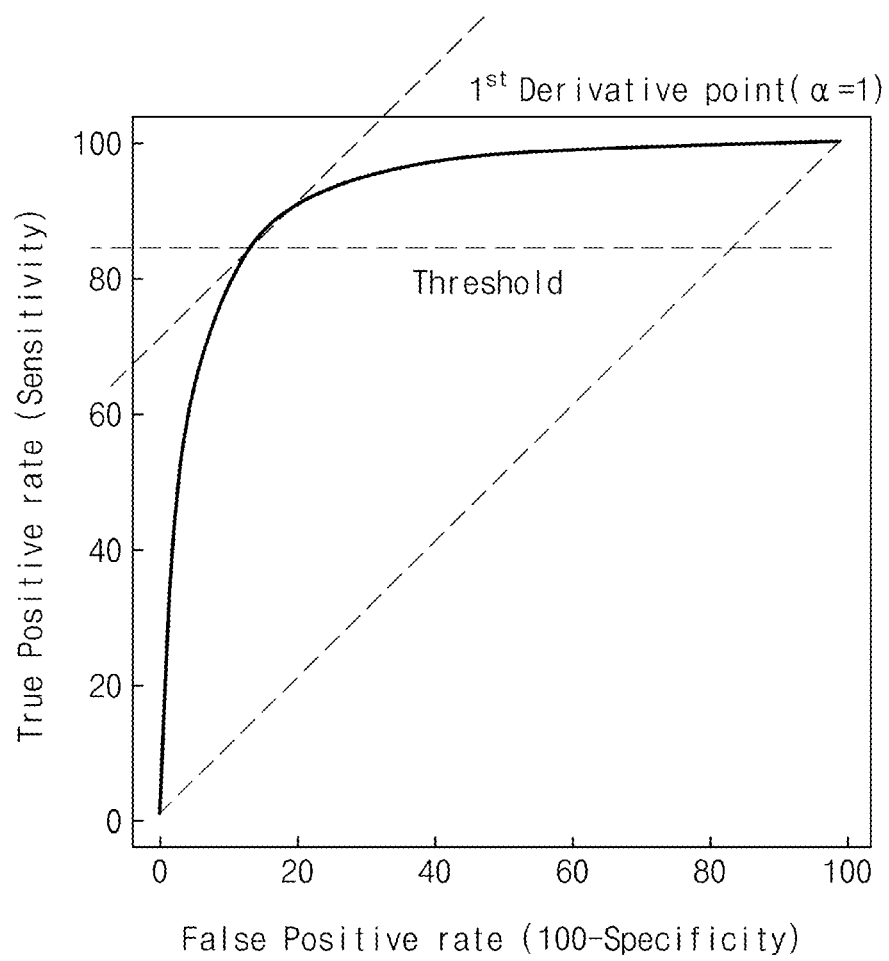
FIG. 3C is an exemplary diagram for illustrating threshold setting according to an embodiment of the present disclosure.

FIG. 2 is a flowchart illustrating a threshold setting method of an anomaly detection system according to an embodiment of the present disclosure. FIG. 3A is an exemplary diagram illustrating an ROC curve according to an embodiment of the present disclosure, FIG. 3B is an exemplary diagram for illustrating TNR estimation according to an embodiment of the present disclosure, and FIG. 3C is an exemplary diagram for illustrating threshold setting according to an embodiment of the present disclosure.

The processor 140 may create the ROC curve using the anomaly data and the normal data (S100). The processor 140 may define the scoring function indicating that the data having the higher value is the data having the higher probability of being the normal data. The processor 140 may measure the scores for the normal data and the anomaly data using the defined scoring function, and may sort the data in the ascending order based on the measured scores. The processor 140 may obtain the coordinates of the graph after measuring the FPR and the TPR sequentially using the predicted probabilities of the sorted list as the classification criterion (the reference value) of the normal data and the anomaly data. The processor 140 may repeat the operation until obtaining the coordinates respectively corresponding to all of the data values of the sorted list to create (obtain) an ROC curve as shown in FIG. 3A.

The processor 140 may set the minimum TPR (N) and the first-order differentiation slope (α) based on a user input (S110). The processor 140 may receive the user input from the human interface device 120. The user input may include the minimum TPR (N) and the first-order differentiation slope (α). The minimum TPR, which is the numeric value indicating the maximum normal data classification performance that the user may tolerate (allow), may be referred to as the recall. The first-order differentiation slope (α) is the numeric value indicating the importance of the normal data classification performance and the anomaly data classification performance as the ratio. In addition, the processor 140 may receive the window size as the user input. The window size may be defined as the data processing unit (the processing capacity) for sensing the change amounts.

The processor 140 may estimate the TNR at which the first-order differentiation value of the ROC curve becomes the first-order differentiation slope (α) (S120). The processor 140 may search for and return the TNR (θ) at which the first-order differentiation value becomes the first-order differentiation slope (α) set by the user in the ROC curve. The processor 140 may stop the search and return the 'θ=N' when the searched TNR (6) becomes smaller than the minimum TPR (N). For example, referring to FIG. 3B, when the first-order differentiation slope (α) is set to '1' and the minimum TPR (N) is set to 70%, the processor 140 may search for the TNR (θ) at which the first-order differentiation value is '1' in the ROC curve. The processor 140 may return θ when the searched θ is equal to or greater than N=70%, which is the minimum TPR, and may return the 70%, which is the minimum TPR, instead of θ when the searched θ is smaller than 70%.

In addition, when there is a non-differentiable section in the ROC curve, the processor 140 may estimate the first-order differentiation value in the corresponding section using the following two methods. The first is the method of simulating the first-order differentiation value by sensing the change amounts of the FPR and the TPR among data as much as the window size set by the user in the sorted list. The second is the method of approximating the graph made by successively connecting the coordinate points with each other as the differentiable function using the bivariate normal distribution estimation and/or the kernel density estimation.

The processor 140 may estimate and set the threshold having the estimated TNR as the recall (S130). The processor 140 may estimate the threshold having the estimated TNR (e) or the minimum TPR (N) as the recall. That is, the processor 140 may set a score or a predicted probability obtained when the recall is el or N as the threshold. For example, referring to FIG. 3C, the processor 140 may set a predicted probability at TPR 85% as the threshold.

Figure 4:
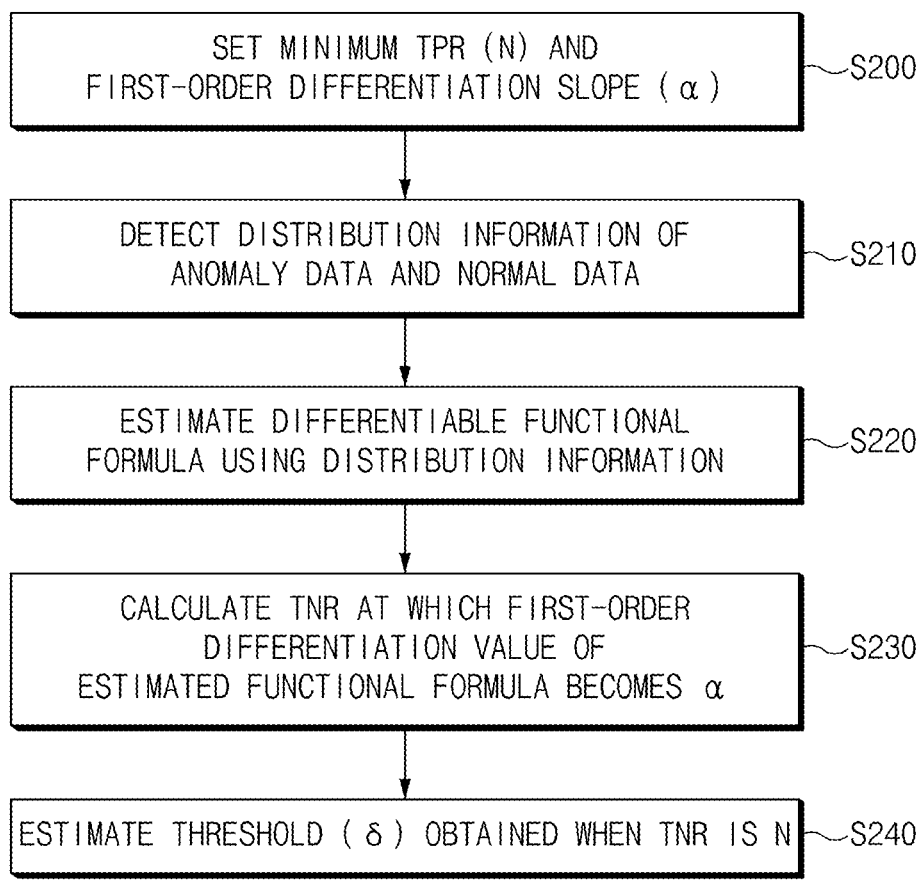
FIG. 4 is a flowchart illustrating a threshold setting method of an anomaly detection system according to another embodiment of the present disclosure.

FIG. 4 is a flowchart illustrating a threshold setting method of an anomaly detection system according to another embodiment of the present disclosure.

The processor 140 may set the minimum TPR (N) and the first-order differentiation slope (α) based on the user input (S200). The processor 140 may receive the user input from the human interface device 120. The processor 140 may set the minimum TPR (N) and the first-order differentiation slope (α) based on the user input. The processor 140 may detect distribution information of the anomaly data and the normal data (S210). The distribution information may include averages and deviations of the anomaly data and the normal data, respectively. That is, the processor 140 may calculate the averages and the deviations of the anomaly data and the normal data, respectively.

The processor 140 may estimate a differentiable functional formula using the detected distribution information (S220). The processor 140 may estimate a functional formula f(x) using the bivariate normal distribution.

The processor 140 may calculate a TNR point at which a first-order differentiation value of the estimated functional formula becomes the first-order differentiation slope (α) (S230). The processor 140 may calculate the TNR point when a differentiated functional formula f'(N) becomes a.

The processor 140 may estimate the threshold (δ) obtained when the calculated TNR point is N (S240).

The processor 140 may set the estimated threshold (δ) as the threshold (the reference value) of the anomaly detection system 100.

Figure 5:
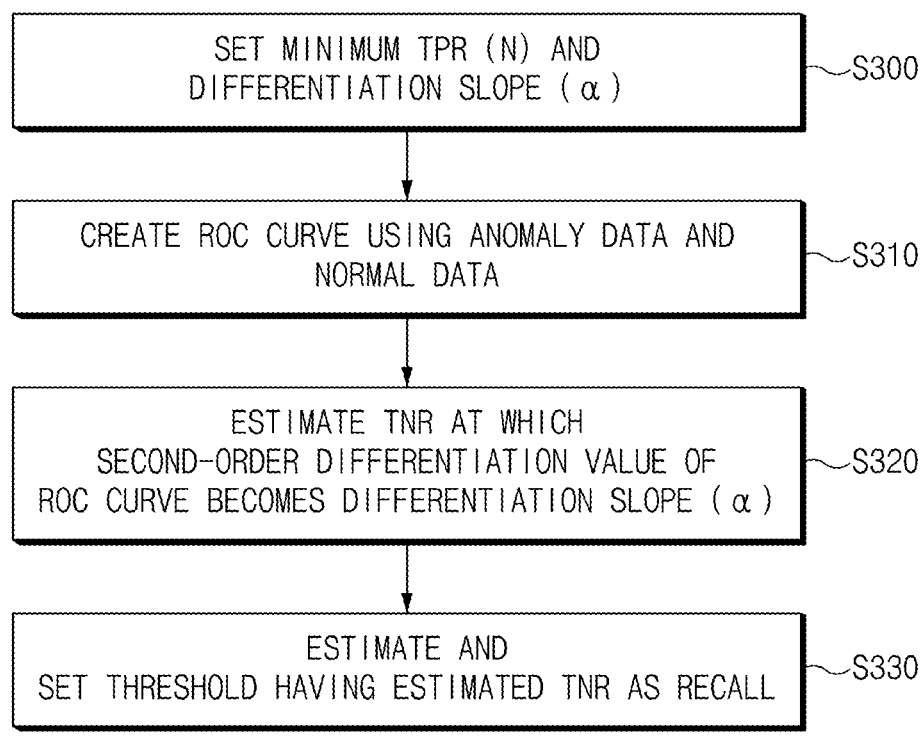
FIG. 5 is a flowchart illustrating a threshold setting method of an anomaly detection system according to another embodiment of the present disclosure.
Figure 6A:
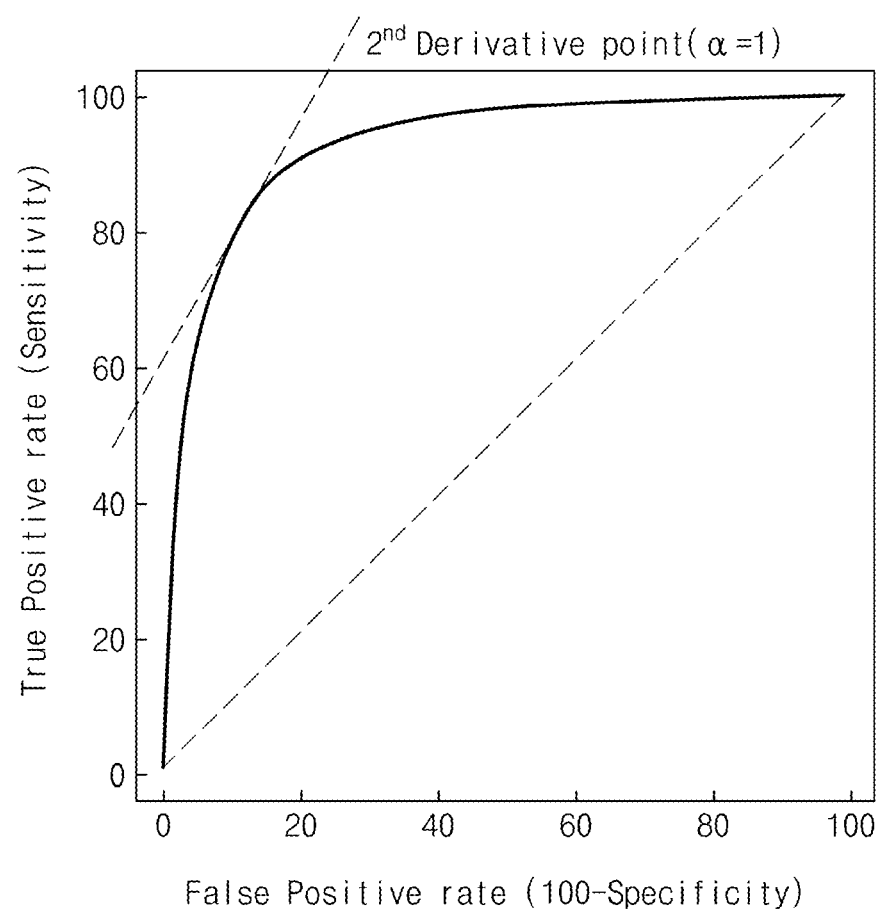
FIGS. 6A and 6B are exemplary diagrams for illustrating threshold setting according to another embodiment of the present disclosure.
Figure 6B:
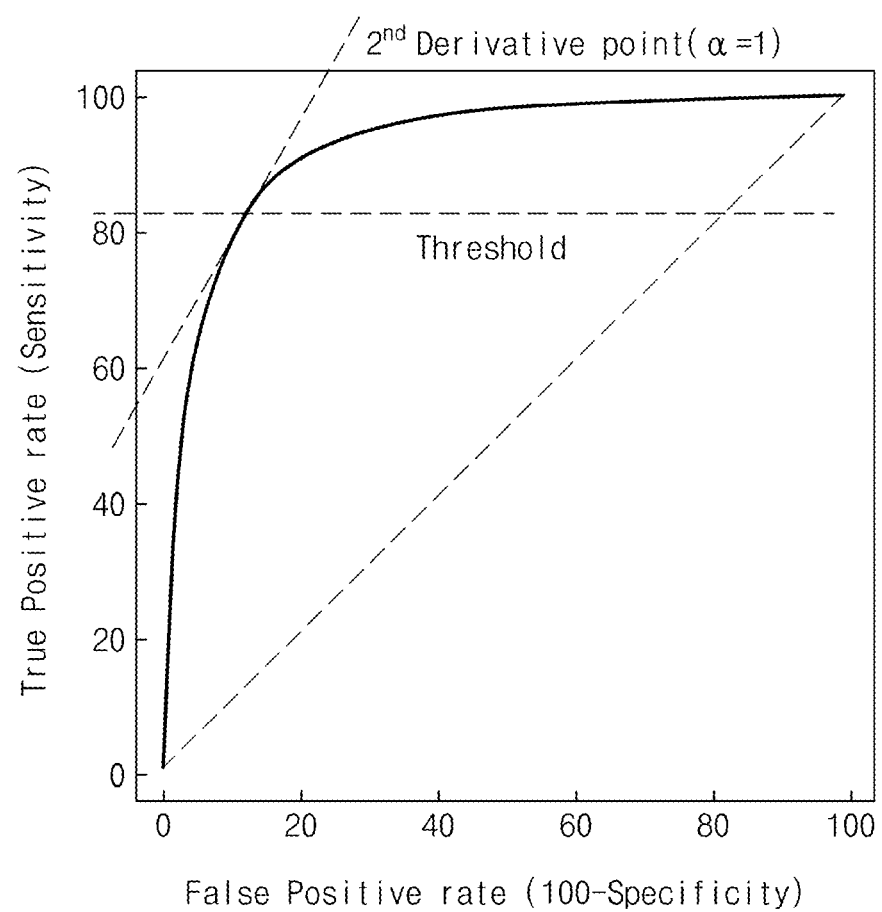

FIG. 5 is a flowchart illustrating a threshold setting method of an anomaly detection system according to another embodiment of the present disclosure. FIGS. 6A and 6B are exemplary diagrams for illustrating threshold setting according to another embodiment of the present disclosure.

The processor 140 may set the minimum TPR (N) and the differentiation slope (α) based on the user input received from the human interface device 120 (S300).

The processor 140 may create the ROC curve using the anomaly data and the normal data (S310).

The processor 140 may estimate a TNR at which a second-order differentiation value of the ROC curve becomes the differentiation slope (α) (S320). As shown in FIG. 6A, the processor 140 may perform second-order differentiation on the ROC curve, and estimate the TNR point at which the second-order differentiation value becomes the preset differentiation slope (α). The processor 140 may derive a point (an inflection point) at which the FPR and the TPR abruptly change by utilizing the second-order differentiation.

The processor 140 may estimate and set the threshold (δ) having the estimated TNR as the recall (S330). As shown in FIG. 6B, the processor 140 may set the inflection point of the FPR and the TPR as the threshold.

Figure 7:
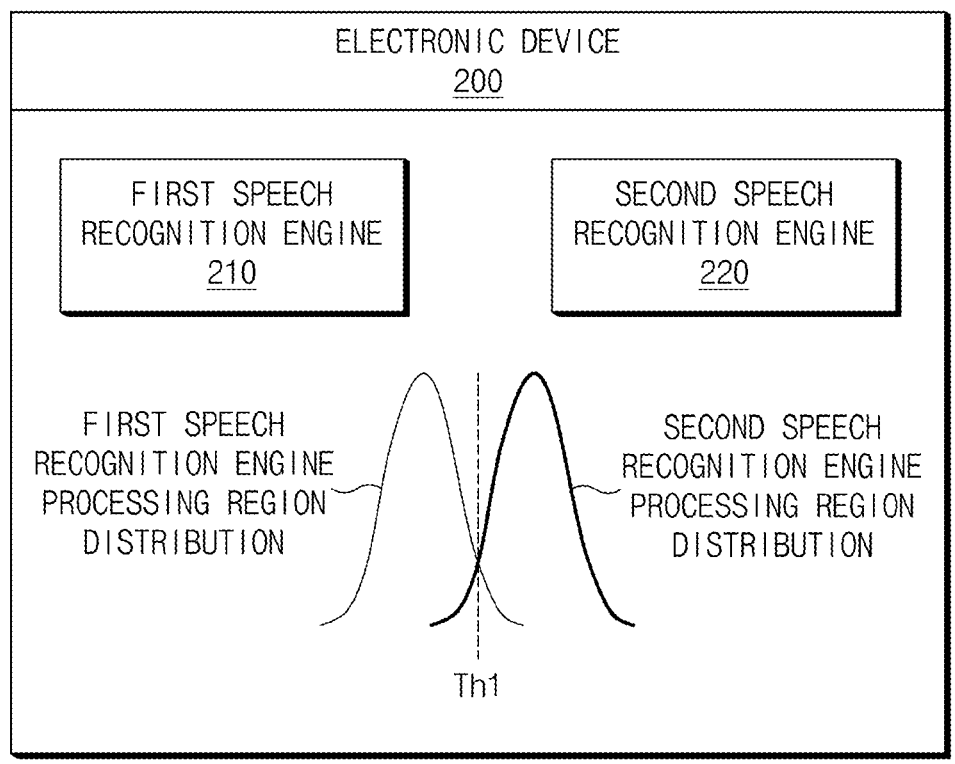
FIG. 7 is an exemplary diagram illustrating an example of speech recognition using an anomaly detection system according to embodiments of the present disclosure.
Figure 8:
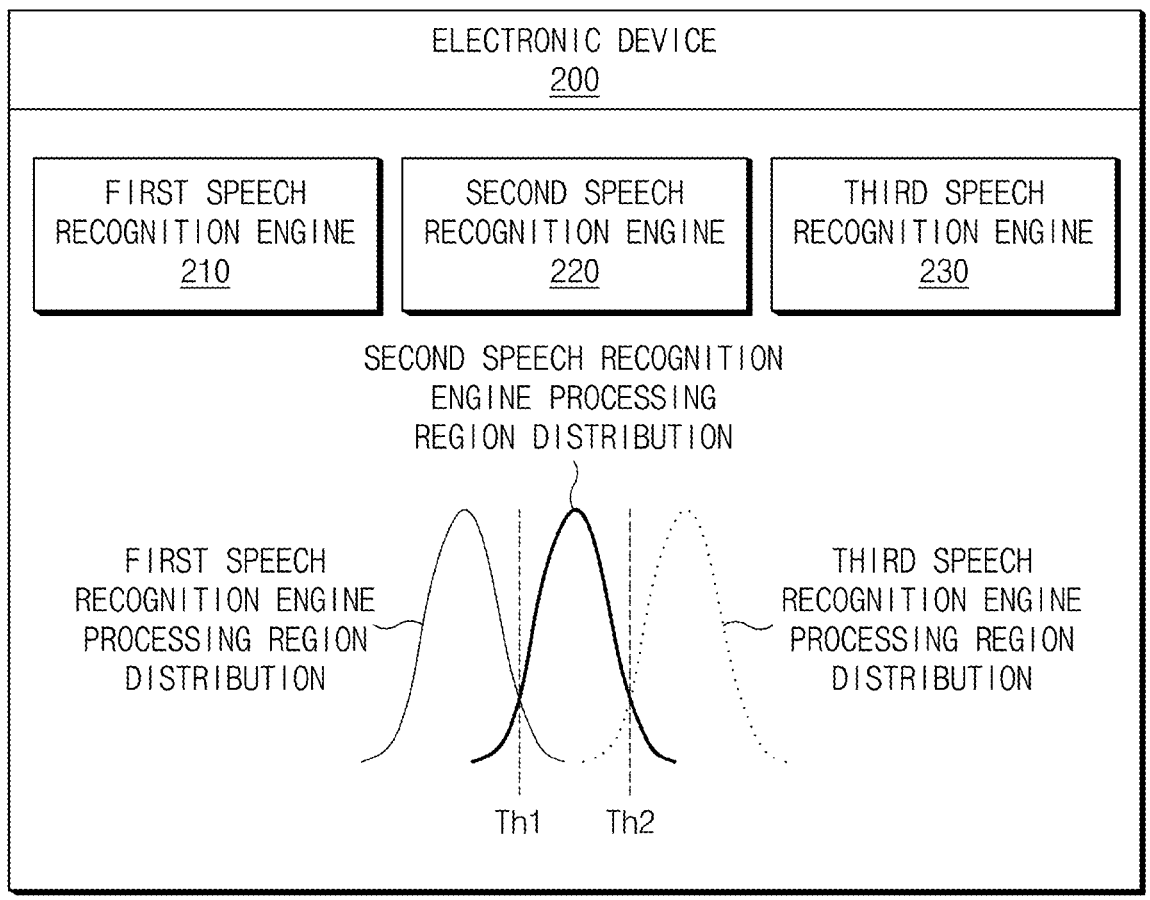
FIG. 8 is an exemplary diagram illustrating another example of speech recognition using an anomaly detection system according to embodiments of the present disclosure.

FIG. 7 is an exemplary diagram illustrating an example of speech recognition using an anomaly detection system according to embodiments of the present disclosure. FIG. 8 is an exemplary diagram illustrating another example of speech recognition using an anomaly detection system according to embodiments of the present disclosure.

In the present embodiment, it is described that an electronic device 200 equipped with a speech recognition function performs speech recognition using the anomaly detection system of the present disclosure. In this connection, the electronic device 200 may be an AUNT (Audio, Video, Navigation, Telematics) terminal and/or an infotainment terminal mounted on a vehicle. Although not shown in the drawings, the electronic device 200 may include at least one processor and a memory. At least one speech recognition engine, the anomaly detection model, and/or a threshold setting engine executed by the processor may be stored in the memory.

The electronic device 200 may receive a speech signal from the outside using a microphone or the like. The electronic device 200 may perform the speech recognition on the input speech signal using one of the at least one speech recognition engine. The electronic device 200 may provide a service such as Internet search, vehicle control, and/or music reproduction based on a speech recognition result.

Referring to FIG. 7, the electronic device 200 may include a first speech recognition engine 210 that supports information search such as a destination and/or a weather and a second speech recognition engine 220 that supports the control of the vehicle and/or the AUNT. When the speech signal is input from the outside, the electronic device 200 may select one of the first speech recognition engine 210 and the second speech recognition engine 220. In this connection, the electronic device 200 may select a speech recognition engine to be used for the speech recognition in consideration of a processing region of each speech recognition engine. A region in which the processing regions of the first speech recognition engine 210 and the second speech recognition engine 220 overlap may occur, which may cause a speech recognition error.

Accordingly, the electronic device 200 may set a processing region boundary of the first speech recognition engine 210 and the second speech recognition engine 220 as a first threshold (Th1) using the threshold setting method of the present disclosure. Thereafter, when the speech signal is input, the electronic device 200 may determine whether the corresponding speech signal is within the first threshold (Th1). The electronic device 200 may perform the speech recognition using the first speech recognition engine 210 when the speech signal is within the first threshold (Th1), and may perform the speech recognition using the second speech recognition engine 220 when the speech signal deviates from (exceeds) the first threshold (Th1).

Referring to FIG. 8, when a third speech recognition engine 230 that supports music search is added to the electronic device 200, a processing region of each speech recognition engine may be defined using the threshold setting method of the present disclosure. For example, the electronic device 200 may set the processing region boundary of the first speech recognition engine 210 and the second speech recognition engine 220 as the first threshold (Th1), and set a processing region boundary of the second speech recognition engine 220 and the third speech recognition engine 230 as a second threshold (Th2). In this case, when the speech signal deviates from the first threshold (Th1) but does not deviate from the second threshold (Th2), the electronic device 200 may perform the speech recognition using the second speech recognition engine 220. In addition, when the speech signal deviates from the first threshold (Th1) and the second threshold (Th2), the electronic device 200 may perform the speech recognition using the third speech recognition engine 230.

The first threshold (Th1) and/or the second threshold (Th2) may be automatically reset when a processing region of at least one speech recognition engine is changed or a new speech recognition engine is introduced. In these embodiments, the first threshold (Th1) and/or the second threshold (Th2) may be reset using the threshold setting method of the present disclosure with little or no direct human control.

The description above is merely illustrative of the technical idea of the present disclosure, and various modifications and changes may be made by those skilled in the art without departing from the essential characteristics of the present disclosure. Therefore, the embodiments disclosed in the present disclosure are not intended to limit the technical idea of the present disclosure but to illustrate the present disclosure, and the scope of the technical idea of the present disclosure is not limited by the embodiments. The scope of the present disclosure should be construed as being covered by the scope of the appended claims, and all technical ideas falling within the scope of the claims should be construed as being included in the scope of the present disclosure.

According to the present disclosure, because the anomaly detection threshold (the reference value) that simultaneously minimizes the loss of the anomaly detection precision and the false positives is adaptively estimated and set, unnecessary effort for setting the anomaly detection threshold may be minimized.

In addition, according to the present disclosure, it is possible to adaptively adjust the anomaly detection performance while preventing an excessive loss of the precision.

In addition, according to the present disclosure, it is possible to set a threshold of the anomaly detection model that matches an importance ratio between anomaly detection and normal detection desired by the user.

Hereinabove, although the present disclosure has been described with reference to exemplary embodiments and the accompanying drawings, the present disclosure is not limited thereto, but may be variously modified and altered by those skilled in the art to which the present disclosure pertains without departing from the spirit and scope of the present disclosure claimed in the following claims.

What is claimed is:

1. A method for setting a threshold of a system for detecting an anomaly, the method comprising:
    setting, by a processor, a minimum true positive rate (TPR) and a differentiation slope based on a user input;
    creating, by the processor, a receiver operating characteristic (ROC) curve using anomaly data and normal data;
    estimating, by the processor, a true negative rate (TNR) from the ROC curve based on the minimum TPR and the differentiation slope; and
    estimating and setting, by the processor, the threshold based on the estimated TNR;
    selecting, by the processor, one of at least one speech recognition engine based on the estimated threshold in response to receiving a speech signal from the outside using a microphone; and
    performing, by the processor, speech recognition on the speech signal using the selected speech recognition engine,
    wherein the threshold is automatically reset when a processing region of the at least one speech recognition engine is changed or a new speech recognition engine is introduced.

2. The method of claim 1, wherein the estimating of the TNR includes:
    estimating, by the processor, a TNR point where a first-order differentiation value of the ROC curve becomes the differentiation slope.

3. The method of claim 1, wherein the estimating of the TNR includes:
    estimating, by the processor, a differentiable functional formula using distribution information of the anomaly data and the normal data; and
    estimating, by the processor, a TNR point where a first-order differentiation value of the estimated functional formula becomes the differentiation slope.

4. The method of claim 1, wherein the estimating of the TNR includes:
    estimating, by the processor, a TNR point where a second-order differentiation value of the ROC curve becomes the differentiation slope.

5. The method of claim 1, wherein the estimating of the TNR includes:
    returning, by the processor, the estimated TNR when the estimated TNR is equal to or greater than the minimum TPR.

6. The method of claim 5, wherein the estimating of the TNR further includes:
    stopping, by the processor, the TNR estimation and returning, by the processor, the minimum TPR as the estimated TNR when the estimated TNR is smaller than the minimum TPR.

7. The method of claim 1, wherein the estimating and the setting of the threshold includes:
    setting, by the processor, a predicted probability obtained when a recall is the estimated TNR as the threshold.

8. A system for detecting an anomaly, the system comprising:
    a memory for storing anomaly data and normal data; and
    a processor connected to the memory,
    wherein the processor is configured to:
        set a minimum true positive rate (TPR) and a differentiation slope based on a user input;
        create a receiver operating characteristic (ROC) curve using the anomaly data and the normal data;
        estimate a true negative rate (TNR) from the ROC curve based on the minimum TPR and the differentiation slope;
        estimate and set a threshold based on the estimated TNR;
        select one of at least one speech recognition engine based on the estimated threshold in response to receiving a speech signal from the outside using a microphone; and
        perform speech recognition on the speech signal using the selected speech recognition engine,
    wherein the threshold is automatically reset when a processing region of the at least one speech recognition engine is changed or a new speech recognition engine is introduced.

9. The system of claim 8, wherein the processor is further configured to:
    estimate a TNR point where a first-order differentiation value of the ROC curve becomes the differentiation slope.

10. The system of claim 8, wherein the processor is further configured to:
    estimate a differentiable functional formula using distribution information of the anomaly data and the normal data; and
    estimate a TNR point where a first-order differentiation value of the estimated functional formula becomes the differentiation slope.

11. The system of claim 8, wherein the processor is further configured to:
    estimate a TNR point where a second-order differentiation value of the ROC curve becomes the differentiation slope.

12. The system of claim 8, wherein the processor is further configured to:
    return the estimated TNR when the estimated TNR is equal to or greater than the minimum TPR.

13. The system of claim 12, wherein the processor is further configured to:
    stop the TNR estimation and return the minimum TPR as the estimated TNR when the estimated TNR is smaller than the minimum TPR.

14. The system of claim 8, wherein the processor is further configured to:

set a predicted probability obtained when a recall is the estimated TNR as the threshold.

* * * * *